United States Patent [19]
Sezginer et al.

[11] Patent Number: 5,831,433
[45] Date of Patent: Nov. 3, 1998

[54] WELL LOGGING METHOD AND APPARATUS FOR NMR AND RESISTIVITY MEASUREMENTS

[76] Inventors: Abdurrahman Sezginer, 85 Carol St., Danbury, Conn. 06810; Douglas Griffin, 28 Sunset Hill Rd., Bethel, Conn. 06801

[21] Appl. No.: 759,829

[22] Filed: Dec. 4, 1996

[51] Int. Cl.⁶ .................................................. G01V 3/32
[52] U.S. Cl. .......................................................... 324/303
[58] Field of Search .................................... 324/300, 303, 324/307, 309, 318, 322, 338–341

[56] References Cited

U.S. PATENT DOCUMENTS

| | | | |
|---|---|---|---|
| 4,185,238 | 1/1980 | Hutchital et al. | 324/338 |
| 4,350,955 | 9/1982 | Jackson et al. | 324/303 |
| 4,899,112 | 2/1990 | Clark et al. | 324/338 |
| 4,933,638 | 6/1990 | Kenyon et al. | 324/303 |
| 5,023,551 | 6/1991 | Kleinberg et al. | 324/303 |
| 5,055,787 | 10/1991 | Kleinberg et al. | 324/303 |
| 5,055,788 | 10/1991 | Kleinberg et al. | 324/303 |
| 5,157,605 | 10/1992 | Chandler et al. | 364/422 |
| 5,278,501 | 1/1994 | Guilfoyle | 324/303 |
| 5,280,243 | 1/1994 | Miller | 324/303 |
| 5,376,884 | 12/1994 | Sezginer | 324/303 |
| 5,557,200 | 9/1996 | Coates | 324/303 |

FOREIGN PATENT DOCUMENTS 2311864  10/1997  United Kingdom.

Primary Examiner—Sandra L. O'Shea
Assistant Examiner—Michael Eisenberg
Attorney, Agent, or Firm—Martin M. Novack; Keith G. S. Smith

[57] ABSTRACT

A method is disclosed for determining a nuclear magnetic resonance characteristic and the resistivity of earth formations surrounding a borehole, including the following steps: passing a logging device through the borehole; producing, at the logging device, a static magnetic field; producing, at the logging device, electromagnetic energy having a field component in the formations that is orthogonal to the static magnetic field; receiving, at the logging device, electromagnetic energy that has passed through said formations; and determining, from the received electromagnetic energy, the nuclear magnetic resonance characteristic of the formations and the resistivity of the formations.

22 Claims, 5 Drawing Sheets

WELL LOGGING METHOD AND APPARATUS FOR NMR AND RESISTIVITY MEASUREMENTS

FIELD OF THE INVENTION

This invention relates to the field of well logging and, more particularly, to an apparatus and method for determining both a nuclear magnetic resonance characteristic and the resistivity of earth formations surrounding a borehole.

BACKGROUND OF THE INVENTION

In the evaluation of earth boreholes drilled in earth formations to produce hydrocarbons, determinations of the porosity and the electrical resistivity of the formations are considered essential for decision making. Nuclear magnetic resonance ("NMR") provides a means of measuring total and producible porosity of earth formations. In certain conditions NMR well logging can provide important information on the pore size of formation rock and on the type of fluid contained therein. Measurement of nuclear resonance requires a static magnetic field $\overline{B}_0$ and a radio frequency (RF) magnetic field in the earth formation that is being probed. [As used herein, an RF field generally has a frequency in the range 2 KHz to 10 MHz.] Subatomic particles with a nonzero magnetic moment and spin angular momentum precess about the static field $\overline{B}_0$ with an angular frequency $\omega_0 = \gamma B_0$ when perturbed from their thermal equilibrium. The constant $\gamma$ is the gyromagnetic ratio of the resonating particle, most commonly the hydrogen nucleus. For hydrogen nuclei, the gyromagnetic ratio is $2.675198775 \times 10^8$ radian/second/Tesla. To manipulate the spin state of the particles, for example, to perturb the thermal equilibrium, a radio frequency (RF) magnetic field $\overline{B}_1$ is needed. The frequency of the RF field $\overline{B}_1$ should be close to $\omega_0$ and substantially perpendicular to the static field $\overline{B}_0$ in the region of investigation. Magnetic resonance is observed by detecting the oscillating magnetic field produced by the precession of the spins. Typically, but not necessarily, the same coil that produces the RF field $\overline{B}_1$ is used for detection. In pulse-NMR, repeated pulses are applied to the coil and spin-echoes are detected in between the transmitted pulses. Reference can be made, for example, to U.S. Pat. Nos. 5,376,884, 5,055,788, 5,055,787, 5,023,551, 4,933,638, and 4,350,955 with regard to known nuclear magnetic resonance logging techniques.

Another commonly used technique for evaluating formations surrounding an earth borehole is resistivity logging. (In the present application, any references to determination or use of resistivity are intended to generically mean conductivity as well, and vice versa. These quantities are reciprocals, and mention of one or the other herein is for convenience of description, and not intended in a limiting sense.) Porous formations having high resistivity generally indicate the presence of hydrocarbons, while porous formations with low resistivity are generally water saturated. However, the region immediately surrounding the borehole can be invaded by borehole fluid or mud filtrate and have a different resistivity than the virgin formation.. If the resistivity logging device has at least two radial depths of investigation, there is the advantage of having, for example, a shallow measurement and a deep measurement. Also, the combination of the two can provide additional information such as the extent of invasion. It is also possible to use the shallow reading to correct the deeper reading and thereby obtain a better estimate of the true formation resistivity. The U.S. Pat. No. 4,899,112 discloses a resistivity measuring tool that can determine resistivity at plural depths of investigation using a single receiver pair. U.S. Pat. No. 5,157,605 discloses a resistivity measuring tool that determines resistivity at multiple depths of investigation using several receiver spacings.

In commercial well logging, the size, complexity, and cost of equipment are important. This is true for so-called "wireline" logging of earth boreholes (when the drill string is out of the borehole) but is particularly important in so-called "logging while drilling". It is, of course, desirable to have as many useful measurements as possible. As an example, it may be desirable to have a downhole assembly that includes tools of the type summarized above for measuring NMR and for measuring resistivity. However, each measuring device tends to increase the length of the logging while drilling equipment, as well as its complexity and cost. Most logging while drilling measurements are ideally taken as close as possible to the drill bit. As longer strings of devices are used, some measurements are moved undesirably further from the drill bit. Since undue complexity, cost, and/or positional disadvantage are to be avoided, compromises must be considered when designing logging equipment, and especially logging while drilling equipment.

It is among the objects of the present invention to provide well logging technique and apparatus that is responsive to the indicated limitations of the prior art.

SUMMARY OF THE INVENTION

The present invention is directed to a well logging apparatus and method that addresses the limitations of the prior art relating to existing disadvantages such as tool size, complexity, cost and operating efficiency when measuring a number of characteristics of formations surrounding an earth borehole.

In accordance with an embodiment of the invention there is disclosed an apparatus for determining both a nuclear magnetic resonance characteristic and the resistivity of earth formations surrounding a borehole. A logging device is moveable through the borehole, and includes: means for producing a static magnetic field; a transmitting antenna; means for energizing the transmitting antenna with an oscillating signal to produce electromagnetic energy; and means for receiving the electromagnetic energy. Means are also provided for deriving, from the received electromagnetic energy, a nuclear magnetic resonance property of the formations and the resistivity of the formations.

In a preferred embodiment of the invention, there is provided at least one receiving antenna spaced from the transmitting antenna, and the means for receiving electromagnetic energy comprises a receiver circuit coupled with the transmitting antenna and a further receiver circuit coupled with the at least one receiving antenna. In this embodiment, the deriving means includes means coupled with the receiving circuit for producing a signal representative of the nuclear magnetic resonance property of the formations, and means coupled with the further receiver circuit for producing a signal representative of the resistivity of the formations.

In a disclosed embodiment, the at least one receiving antenna comprises a spaced apart pair of receiving antennas. In this embodiment, the means for producing the static magnetic field comprises first and second longitudinally aligned and longitudinally spaced elongated permanent magnets. The transmitting antenna is disposed between the permanent magnets and the receiving antennas are disposed past one longitudinal end of one of the permanent magnets.

In embodiments hereof, components and functions of NMR and resistivity measuring techniques are combined to achieve reduction in tool size, complexity, and cost, and improvement in operating efficiency. In a logging while drilling embodiment, proximity of measurements to the drill bit is also improved.

Further features and advantages of the invention will become more readily apparent from the following detailed description when taken in conjunction with the accompanying drawings.

DETAILED DESCRIPTION

Figure 1:
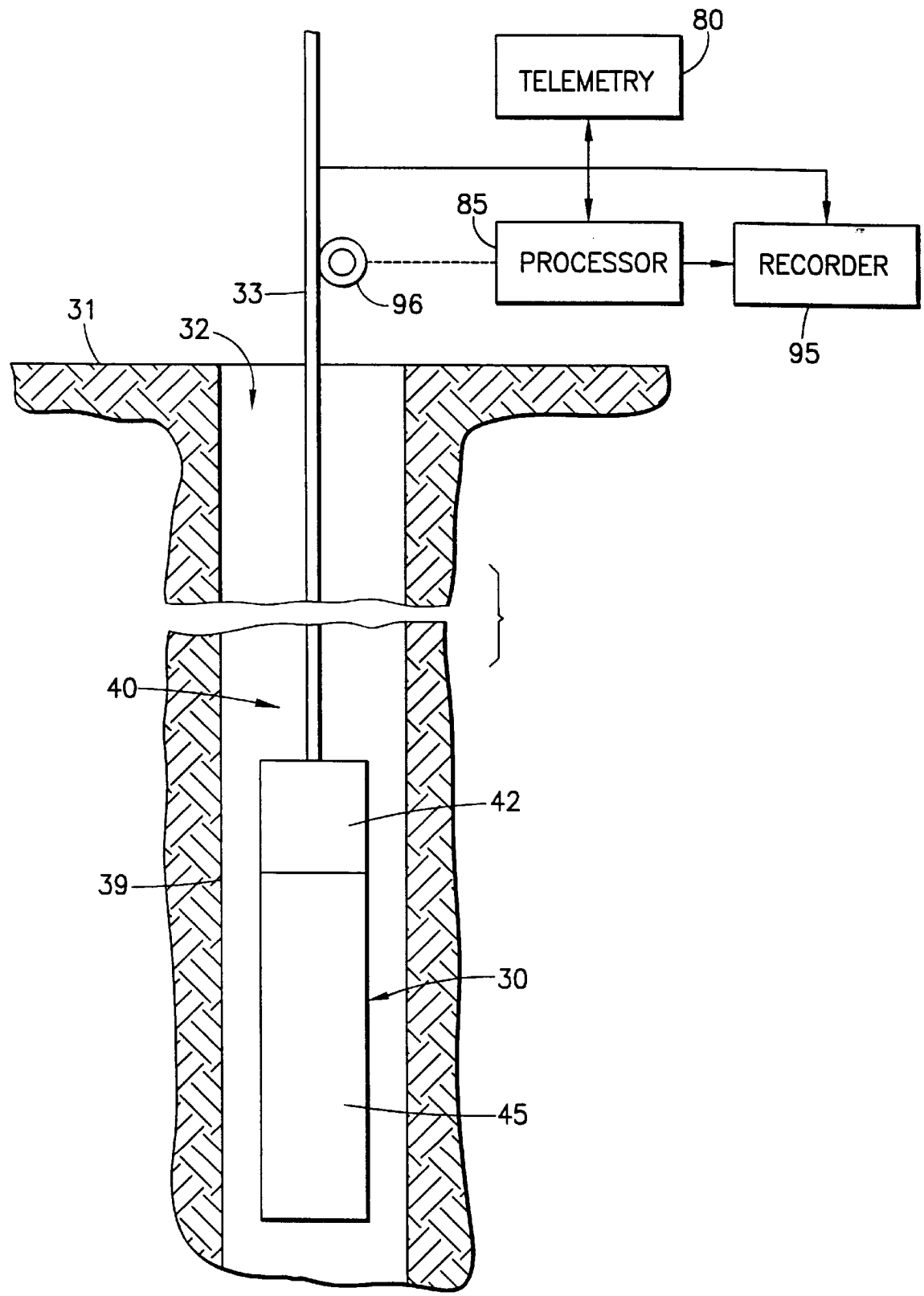
FIG. 1 is a schematic diagram, partially in block form, of an apparatus that can be used in practicing embodiments of the invention.

Referring to FIG. 1, there is shown an apparatus in accordance with an embodiment of the invention for investigating subsurface formations 31 traversed by a borehole 32, and which can be used in practicing embodiments of the method of the invention. The borehole 32 is typically filled with a drilling fluid or mud which contains finely divided solids in suspension and a mudcake 39 is shown on the walls of the borehole.

An investigating apparatus or logging device is suspended in the borehole 32 on an armored cable 33, the length of which substantially determines the relative depth of the device 30. The cable length is controlled by suitable means at the surface such as a drum and winch mechanism (not shown). In the illustrated embodiment, the logging device comprises an elongated cylindrical sonde 40, which can be provided with centralizing arms (not shown). The top portion thereof, 42, can contain electronics and telemetry equipment. Measurement signals can be processed and/or stored downhole, using a downhole processor, but it will be understood that some or all signals could be transmitted uphole for processing and/or storage. Electronic signals indicative of the information obtained by the logging device can be transmitted through the cable 33 to uphole telemetry equipment 80, uphole processor 85, and recorder 95. Depth information to the recorder 95 and processor 85 can be provided from a rotating wheel 96 that is coupled to the cable 33. The processor 85 will typically include associated memory, timing, input/output, display, and printing functions, none of which are separately shown. Although the logging device is shown as a single body, it may alternatively comprise separate components, or may be a tool that is combinable with other logging tools. A portion, 45, of the sonde 40 is a logging device 45, an embodiment of which is illustrated in FIG. 2.

Figure 2:
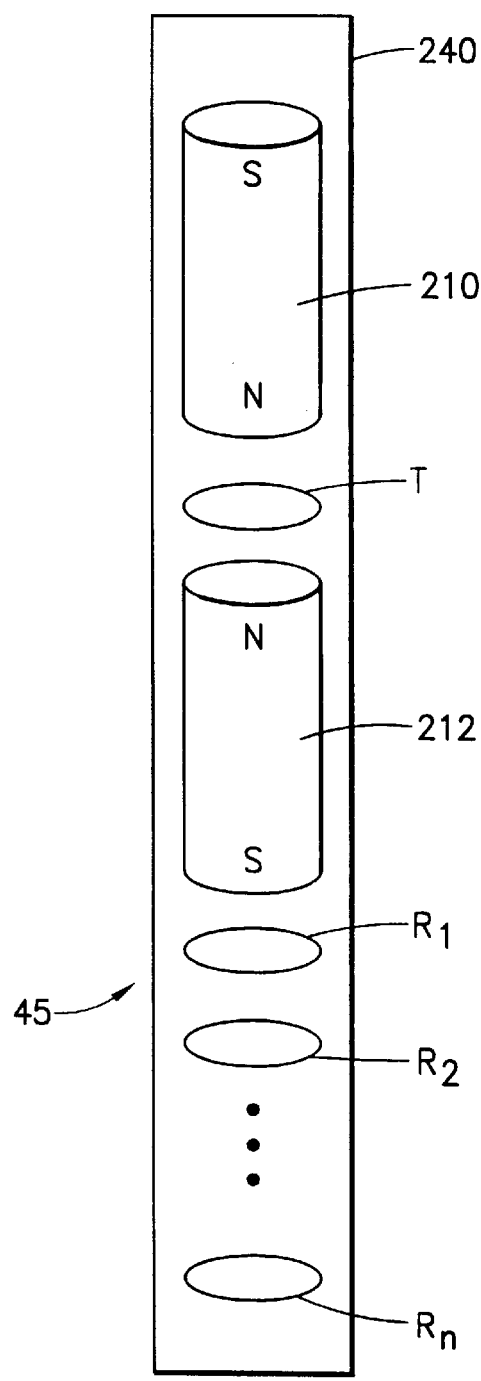
FIG. 2 is a diagram of a logging device in accordance with an embodiment of the invention that can be used in the FIG. 1 apparatus.

In the illustrated embodiment of the logging device of FIG. 2, a housing 240 contains permanent magnets 210 and 212, which have magnetization polarities as illustrated in the Figure, with opposing like polarities (designated N, in this case). A transmitting/receiving antenna, designated TR, is disposed between the magnets 210 and 212, and receiving antennas R1, R2 . . . Rn are disposed, in longitudinally spaced apart relationship, on the other side of magnet 212. [Alternatively, some or all receivers could be provided on the other side of magnet 210.] Preferably, at least two receivers are provided, and further receivers can be utilized to advantage, such as for implementing measurements that provide multiple depths of investigation. The housing 240 is at least partially formed of an insulating material, such as fiberglass. Part of the housing 240 can be metallic, but it should be insulating at least next to the transmitting and receiving antennas. In an embodiment hereof, a central tube, such as a non-magnetic steel tube, supports the magnets 210 and 212, which can be tubular. The magnets can be, for example, rare earth magnets or ceramic magnets. The transmitting and receiving antennas of this embodiment are coils wound on insulating collars, which may be formed, for example, of a ceramic. The circuit wiring can be carried through the central tube. The fiberglass housing of the present embodiment can be oil filled and have a conventional pressure equalizing mechanism, such as a bellows. Circuitry coupled with the transmitting and receiving coils can be disposed within the housing 240 and/or, at least in part, disposed within the portion 42 of the sonde. An embodiment of the circuitry is shown in the diagram of FIG. 3 for the case of two receivers, R1 and R2.

Figure 3:
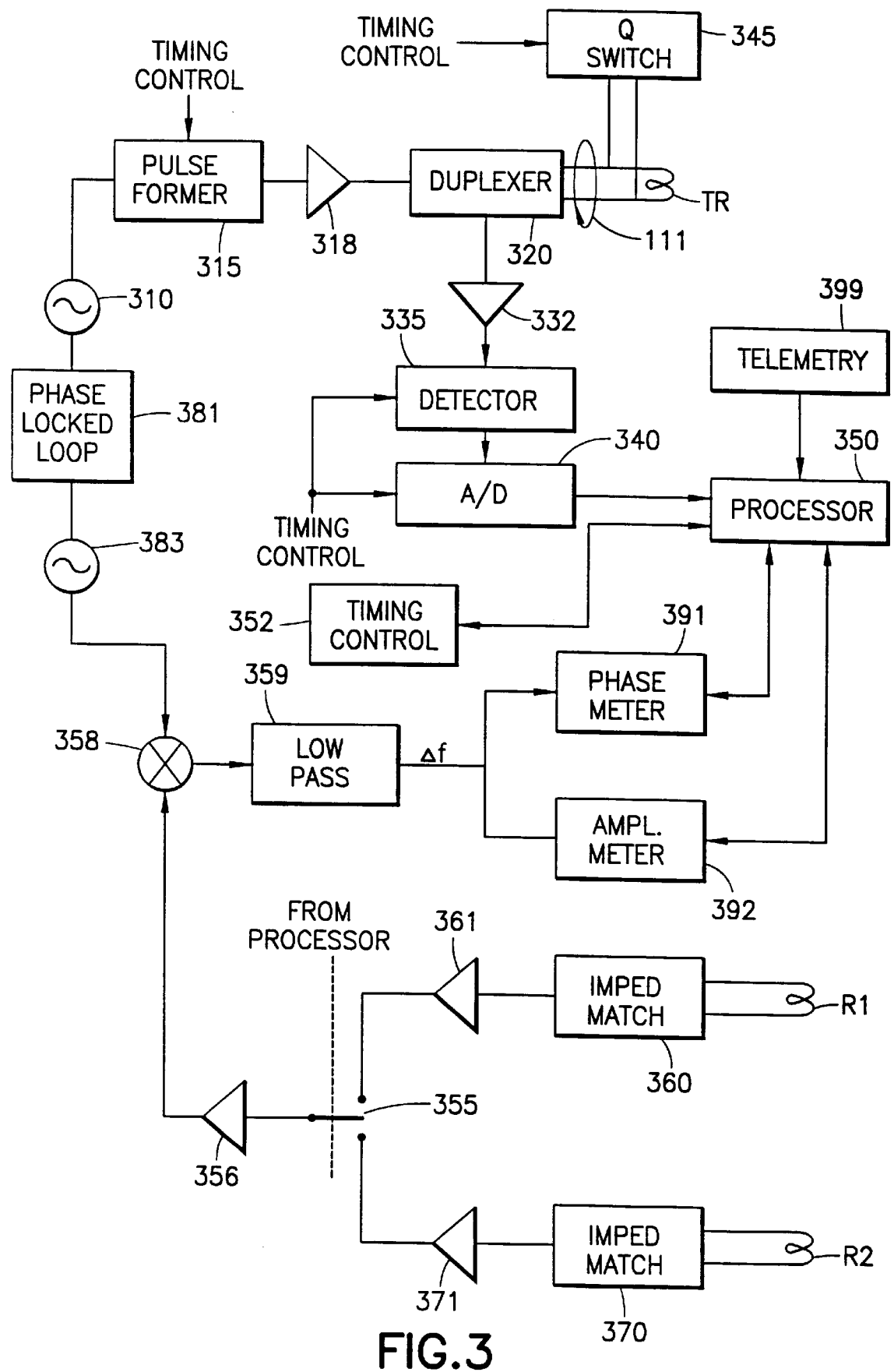
FIG. 3 is a block diagram of circuitry that can be used in practicing an embodiment of the invention.

In the circuit block diagram of FIG. 3, a transmitter section includes an oscillator, represented at 310. An output of the oscillator 310 is coupled to a pulse former 315, the output of which is coupled to a power amplifier 318. The output of power amplifier 318 is coupled to a duplexer 320 which, in turn, is coupled to the input/output leads of the RF coil TR. The duplexer 320 is also coupled to an NMR receiving section that includes an amplifier 332, a phase sensitive detector 335, which also receives the oscillator output, and an analog-to-digital converter 340. The output of analog-to-digital converter 340 is coupled to a downhole processor 350, which may typically be a digital processor with associated memory and input/output circuitry (not separately shown). Timing control circuitry is associated with the processor, as represented at 352, and timing control is suitably provided as illustrated in the diagram. A Q-switch is provided, as represented at 345. Telemetry circuity 399 is conventionally provided for communicating with the earth's surface.

As known in the art, the nuclear magnetic resonance circuitry can operate in three modes: transmitting, damping, and receiving. Reference can be made, for example, to U.S. Pat. Nos. 4,933,638, 5,055,787, 5,055,788, and 5,376,884. As described in the referenced patents, during the transmitting mode, the transmitter section generates relatively large RF power of the order of 1 kilowatt at a frequency of the order of 1 MHz for a short precisely timed period, shuts off this current very quickly, within about 10 microseconds, and then isolates any signals or noise of the power circuits from coupling with detection circuitry. The system operates with a high Q, which can result in undesirable ringing. The Q-switch 345 is provided to reduce this problem. The Q switch closes a circuit at the appropriate time, which changes the impedance seen by conductors 111 so that the system is critically damped, and ringing energy is quickly dissipated. The duplexer 320 protects the receiver section from high power pulses during the transmitting and damping modes. During the receiving mode the duplexer couples the RF coil to the receiver amplifier 332. The amplified signal is coupled to phase sensitive detector 335, which also receives a reference signal from oscillator 310 that controls the frequency of sensitivity of the detector 335. The detected signal is converted to digital form by circuit 340, and coupled to processor 350. Ultimate transmission to the earth's surface for further known processing is implemented by circuitry 399. Reference can be made to the above referenced U.S. Pat. Nos. 4,933,638, 5,055,787, 5,055,788, and 5,376,884 for further details of circuitry and operation.

The signal from receiver R1 is coupled via impedance matching circuit 360 and preamplifier 361 to one input of an electronically controlled switch 355. Similarly, the signal from receiver R2 is coupled via impedance matching circuit 370 and preamplifier 371 to the other input of the switch 355. The switch 355, under control of processor 350, selects the near (R1) or the far (R2) receiver output. The selected signal is amplified by amplifier 356 and subsequently translated to a lower frequency f using a known heterodyne technique. A local oscillator is in a phase locked loop (represented at 381) with the master oscillator 310. The local oscillator 383 has a frequency f+Δf, where Δf is typically a few kilohertz or less. A signal from the local oscillator is mixed with the received signal by a mixer 358, and the mixer output is passed through a low pass filter 359 which blocks signals above Δf and passes the signal at Δf. The signal at frequency Δf contains the phase and amplitude information of the original signal at frequency f. The recognized advantage of this frequency translation is that it is easier to measure the phase and amplitude at kilohertz or lower frequencies than at megahertz frequencies. The signal at frequency Δf is measured with a phase meter 391 and with an amplitude meter 392, and the results are input to the processor 350. The phase meter 391 may utilize a reference signal from the phase locked loop 381. The phase and amplitude meters may also include sample-and-hold circuits, to implement comparison of the signals from the respective receivers. In this regard, reference can be made, for example, to U.S. Pat. No. 4,185,238. Alternatively, the processor may compute the relative phase and amplitude from the measurements it receives. Reference can also be made to U.S. Pat. No. 4,899,112 which describes, inter alia, the obtaining of resistivity at different depths of investigation using the attenuation and phase derived signals.

As noted above, the processor 350 has associated memory, clocking, and interface circuitry, as is conventional. The processor implements storage of the measurements of phase and amplitude, processing of these measurements in the manner described in U.S. Pat. No. 4,899,112, storage of the results of the processing, and/or coupling of the measurements to the telemetry subsystem for transmission to the earth's surface. In a logging while drilling embodiment (to be described next) a downhole clock can be utilized to keep track of time, which can subsequently be correlated with depth level by virtue of keeping a record of the drill string progress. The clock, which can typically be part of the system in conjunction with the processor 350, can be synchronized with the system before a trip downhole. Also, if desired, communication with the downhole system, using mud pulse technology or other suitable communication means, can be utilized to convey timing synchronization and/or depth level information, as well as to communicate data in general. It will be understood that the embodiments of the invention can be utilized in conjunction with any suitable technique for keeping track of depth level.

Figure 6:
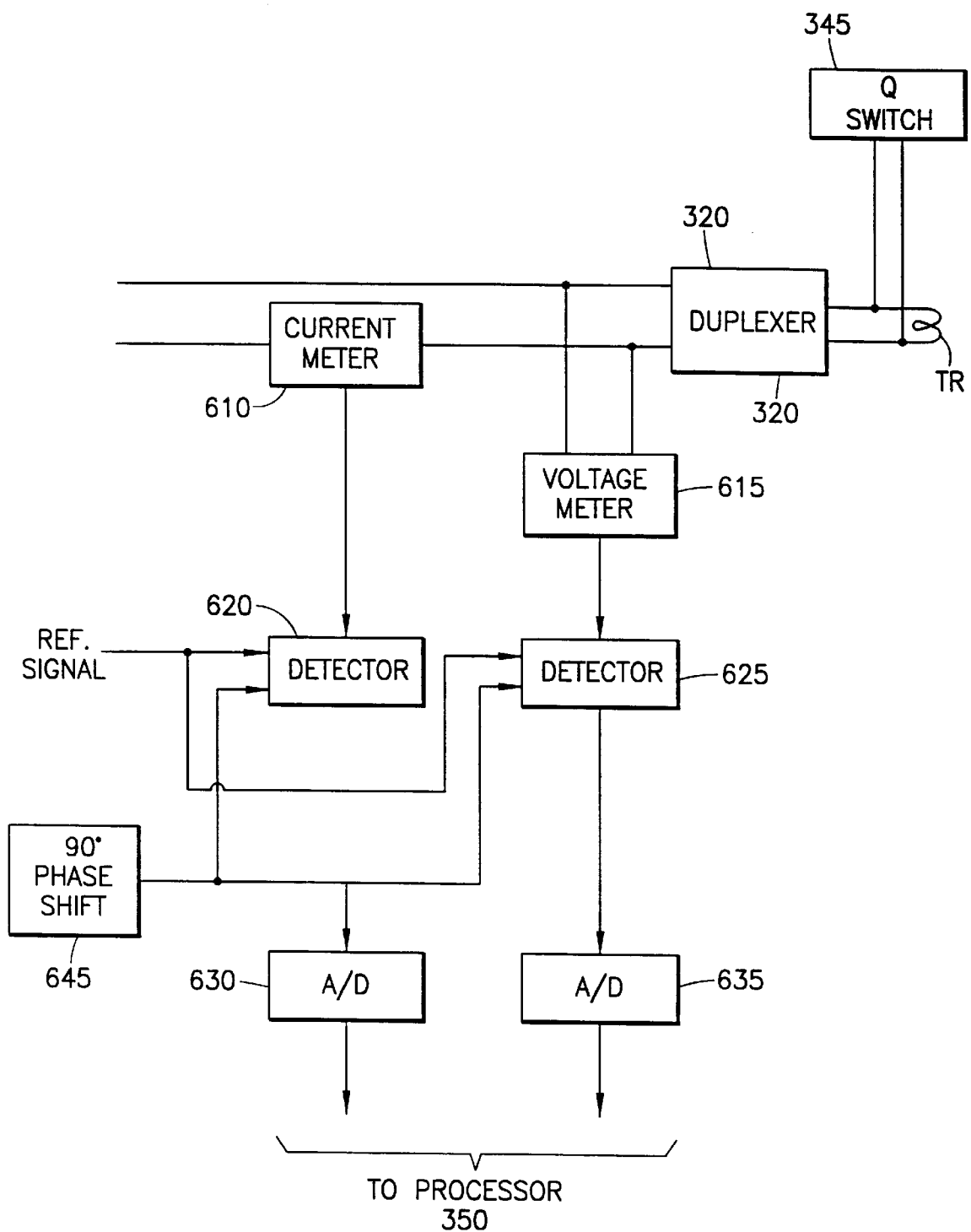
FIG. 6 is a block diagram of circuitry that can be used for measuring formation resistivity.

A resistivity measurement can be made at the antenna TR, such as by determining the impedance looking into the antenna, which is affected by the formations, but is less preferred and will have a relatively shallow depth of investigation. A block diagram of a circuit for making this measurement is illustrated in FIG. 6, which shows the antenna TR, duplexer 320, and Q-switch 345, as in FIG. 3. The voltage and current coupled with the antenna are respectively measured by voltage meter 615 and current meter 610. The measured current and voltage are respectively coupled to two channel phase sensitive detectors 620 and 625 which each receive a reference signal from oscillator 310 and a 90 degree phase shifted version thereof, via the phase shifter 645. The respective outputs of the detectors are converted to digital form by analog to digital converters 630 and 635, and then coupled to processor 350 which determines resistivity as a function of the ratio of the signals.

Figure 4:
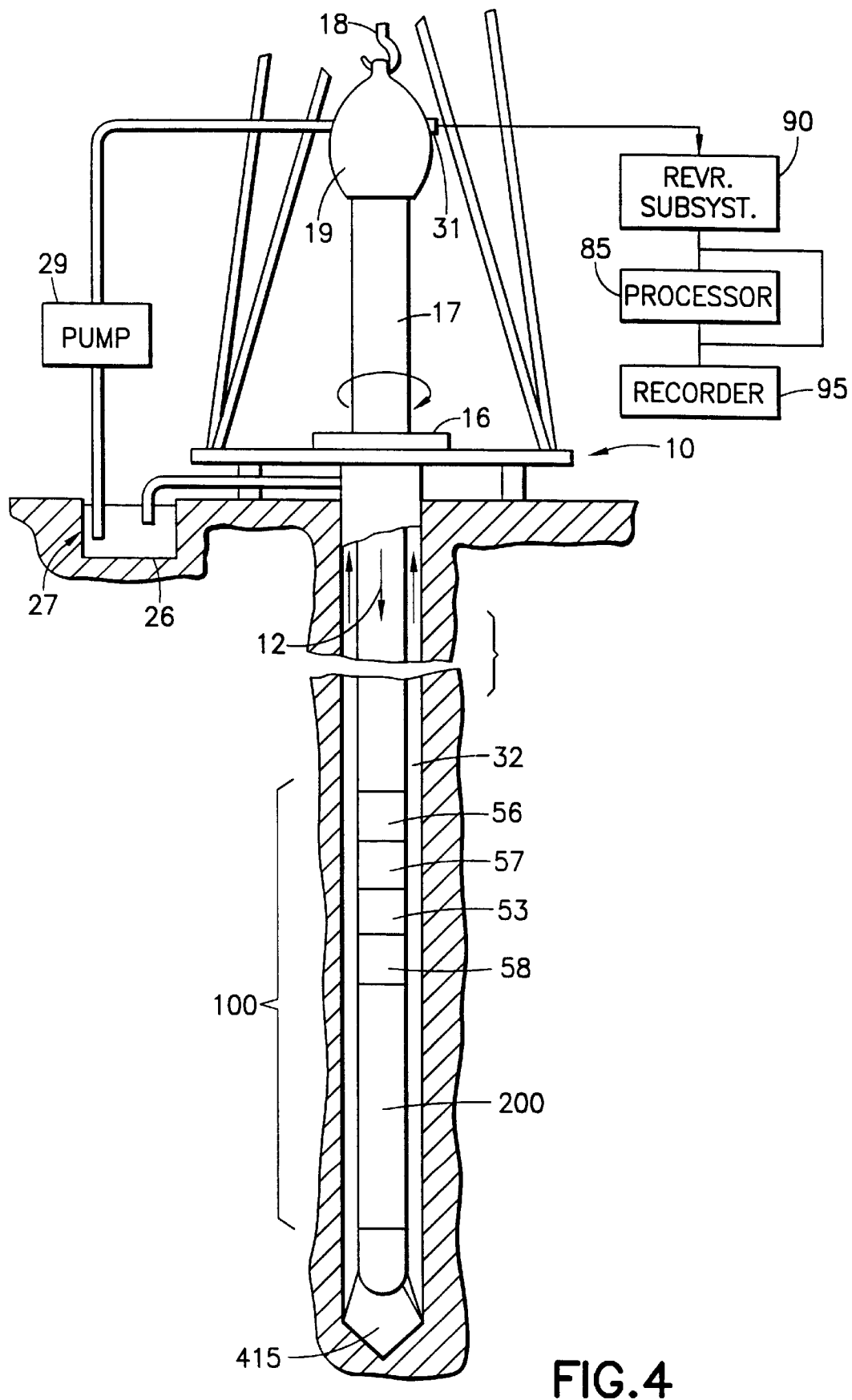
FIG. 4 is a diagram of a logging while drilling system in which an embodiment of the invention can be utilized.

Referring to FIG. 4, there is illustrated an embodiment of the invention in the form of a logging-while-drilling apparatus and method. A platform and derrick 10 are positioned over a borehole 32 that is formed in the earth by rotary drilling. A drill string 12 is suspended within the borehole and includes a drill bit 415 at its lower end. The drill string 12, and the drill bit 415 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Drilling fluid or mud 26 is contained in a pit 27 in the earth. A pump 29 pumps the drilling fluid into the drill string 12 via a port in the swivel 19 to flow downward through the center of drill string 12. The drilling fluid exits the drill string via ports in the drill bit 415 and then circulates upward in the region between the outside of the drill string and the periphery of the borehole. As is well known, the drilling fluid thereby carries formation cuttings to the surface of the earth, and the drilling fluid is returned to the pit 27 for recirculation. The small arrows in the Figure illustrate the typical direction of flow of the drilling fluid.

Figure 5:
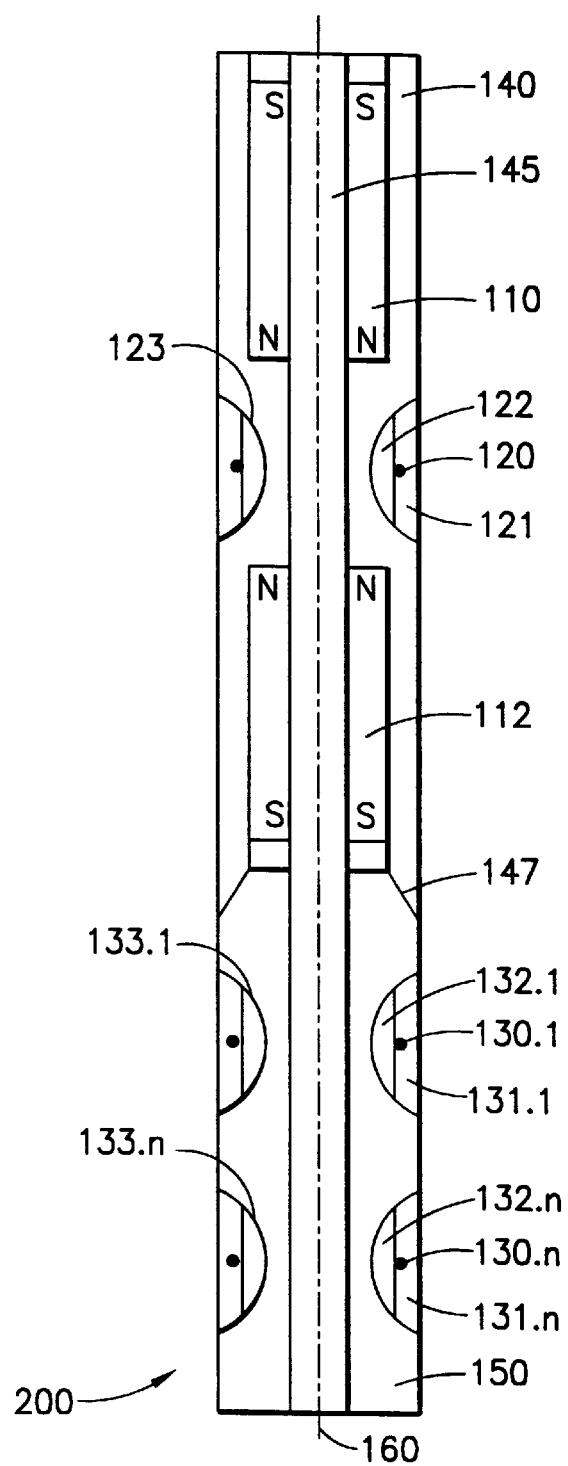
FIG. 5 is a diagram of a logging device in accordance with another embodiment of the invention that can be used in the FIG. 4 apparatus.

Mounted within the drill string 12, preferably near the drill bit 15, is a downhole sensing, processing, storing and transmitting subsystem 100. Subsystem 100 includes a measuring apparatus 200 in accordance with an embodiment of the invention, and which is illustrated in FIG. 5. A communications transmitting portion of the downhole subsystem includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 95.

Transmitter 56 can be controlled by conventional transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58, which can include electronics as shown in FIG. 3. The acquisition and processor electronics 58 are coupled to the measuring apparatus 200 and obtain measurement information therefrom. In known manner, the acquisition and processor electronics is capable of storing data from the measuring apparatus, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling. If desired, the drilling equipment can optionally be a directional drilling equipment (not shown).

FIG. 5 illustrates an embodiment of the downhole measuring apparatus 200 (of FIG. 4) in accordance with an embodiment of the apparatus. The general configuration is similar to that of FIG. 2. The tool 200 is rotationally symmetric about axis 160 of the drill collar which is substantially aligned with the axis of the borehole. The static magnetic field is produced by tubular, axially polarized, permanent magnets 110 and 112 mounted inside the drill collar 140. Channel 145 located inside the tool and the magnets, conveys drilling mud to the drill bit. The RF pulses necessary for the NMR measurement are produced by coil 120 located in a groove 123 in the outside of drill collar 140. NMR signal is detected by coil 120 in between the transmitted pulses. Coil 120 is mounted outside the drill collar because RF magnetic fields cannot penetrate the metallic drill collar. The impedance of coil 120 can be used to obtain an indication of the resistivity of the drilling mud and formation immediately around coil 120. While the RF pulses are being transmitted by coil 120, they are received by coils 130.1, 130.2, . . . ,130.n. only two receiver coils, 130.1 and 130.n are shown in FIG. 2 for simplicity. Coils 130.1, . . . ,130.n are located in grooves 133.1, . . . , 133.n in the outside of the drill collar 150. The coils 120, 130.1, . . . ,130.n are protected from the abrasion and impact of the drilling environment by shields 121, 131.1, . . . ,131.n, which can comprise slotted metallic tubes and/or insulating material. The coils 120, 130.1, . . . ,130.n are separated from the drill collar 140, 150 by insulating spacers 122, 132.1, . . . ,132.n which are preferably made of ferrite to increase the efficiency of the coils. Drill collars 140 and 150 can be screwed into each other by the threaded joint 147. This simplifies mounting and servicing of magnet 112.

The invention has been described with reference to particular preferred embodiments, but variations within the spirit and scope of the invention will occur to those skilled in the art. For example, it will be understood that other types of antennas and/or other antenna orientations could be used, and also that formation anisotropy or dipping beds can be detected by determining orthogonal components of received signals, as is known in the art. Also, borehole compensation or computed borehole compensation can be employed by providing additional transmitter and/or receiver antennas and suitable known type of circuitry.

We claim:

1. Apparatus for determining both a nuclear magnetic resonance characteristic and resistivity of earth formations surrounding a borehole, comprising:
   a logging device moveable through the borehole, and including:
   means for producing a static magnetic field;
   a transmitting antenna;
   at least one receiving antenna spaced from said transmitting antenna;
   means for energizing said transmitting antenna with an oscillating signal to produce electromagnetic energy;
   a first receiver circuit coupled with said transmitting antenna for receiving nuclear magnetic resonance signals from said formations; and
   a second receiver circuit coupled with said at least one receiving antenna for receiving electromagnetic energy that has propagated through said formations;
   means for deriving, from said received nuclear magnetic resonance signals, a nuclear magnetic resonance property of said formations; and
   means coupled with said second receiver circuit for deriving, from the received electromagnetic energy, the resistivity of said formations.

2. Apparatus as defined by claim 1, wherein said at least one receiving antenna comprises a spaced apart pair of receiving antennas.

3. Apparatus as defined by claim 2, wherein said transmitting antenna and said receiving antennas comprise coils.

4. Apparatus as defined by claim 3, wherein said means for producing said static magnetic field comprises first and second longitudinally aligned and longitudinally spaced elongated permanent magnets, and wherein said transmitting antenna is disposed between said permanent magnets and said receiving antennas are disposed past one longitudinal end of one of said permanent magnets.

5. Apparatus as defined by claim 4, wherein said logging device is mounted in a drill string in said borehole.

6. Apparatus as defined by claim 3, wherein said means for producing said static magnetic field comprises at least one permanent magnet.

7. Apparatus as defined by claim 2, wherein said means for producing said static magnetic field comprises at least one permanent magnet.

8. Apparatus as defined by claim 2, wherein said means for producing said static magnetic field comprises first and second longitudinally aligned and longitudinally spaced elongated permanent magnets, and wherein said transmitting antenna is disposed between said permanent magnets and said receiving antennas are disposed past one longitudinal end of one of said permanent magnets.

9. Apparatus as defined by claim 2, wherein said logging device is mounted in a drill string in said borehole.

10. Apparatus as defined by claim 2, wherein said means for deriving the resistivity of said formations includes means for determining the relative phase of the electromagnetic energy received at said pair of receiving antennas.

11. Apparatus as defined by claim 2, wherein said means for deriving the resistivity of said formations includes means for determining the relative amplitude of the electromagnetic energy received at said pair of receiving antennas.

12. Apparatus as defined by claim 1, wherein said oscillating signal is an RF signal.

13. Apparatus as defined by claim 1, wherein said logging device is mounted in a drill string in said borehole.

14. A method for determining a nuclear magnetic resonance characteristic and the resistivity of earth formations surrounding a borehole, comprising the steps of:

passing a logging device through the borehole;

producing, at said logging device, a static magnetic field;

producing, at a transmitter location of said logging device, electromagnetic energy having a field component in said formations that is orthogonal to said static magnetic field;

receiving, at said transmitter location, nuclear magnetic resonance signals from said formations;

receiving, at at least one receiver location of said logging device that is spaced from said transmitter location, electromagnetic energy that has passed through said formations;

determining, from said received nuclear magnetic resonance signals, a nuclear magnetic resonance characteristic of said formations; and determining, from said electromagnetic energy received at said at least one receiver location, the resistivity of said formations.

15. The method as defined by claim 14, wherein said at least one receiver location comprises first and second spaced apart receiver locations.

16. The method as defined by claim 15, wherein said step of passing a logging device through said borehole comprises attaching said logging device to a drill string that is moved through said borehole.

17. The method as defined by claim 15, wherein said step of determining from electromagnetic energy received at said first and second receiver locations includes determining the relative phase of the electromagnetic energy received at said first and second receiver locations.

18. The method as defined by claim 15, wherein said step of determining from electromagnetic energy received at said first and second receiver locations includes determining the relative amplitude of the electromagnetic energy received at said first and second receiver locations.

19. The method as defined by claim 14, wherein said step of passing a logging device through said borehole comprises attaching said logging device to a drill string that is moved through said borehole.

20. The method as defined by claim 14, wherein said electromagnetic energy is RF electromagnetic energy.

21. Apparatus for determining both a nuclear magnetic resonance characteristic and resistivity of earth formations surrounding a borehole, comprising:

a logging device moveable through the borehole, and including:

means for producing a static magnetic field;

a transmitting antenna;

means for energizing said transmitting antenna with an oscillating signal to produce electromagnetic energy;

means coupled with said transmitting antenna for receiving nuclear magnetic resonance signals from said formations;

means for deriving, from said received nuclear magnetic resonance signals, a nuclear magnetic resonance property of said formations; and means for deriving the resistivity of said formations by determining the impedance looking into said antenna.

22. A method for determining a nuclear magnetic resonance characteristic and the resistivity of earth formations surrounding a borehole, comprising the steps of:

passing a logging device through the borehole;

producing, at said logging device, a static magnetic field;

producing, at an antenna of said logging device, electromagnetic energy having a field component in said formations that is orthogonal to said static magnetic field;

receiving, at said antenna, nuclear magnetic resonance signals from said formations;

deriving, from said nuclear magnetic resonance signals, a nuclear magnetic resonance characteristic of said formations; and measuring the impedance looking into said antenna, said measured impedance being indicative of the resistivity of said formations.

* * * * *